(12) United States Patent
Bass et al.

(10) Patent No.: US 6,977,928 B1
(45) Date of Patent: Dec. 20, 2005

(54) METHOD AND SYSTEM FOR DATA FLOW MULTICASTING

(75) Inventors: Brian Mitchell Bass, Apex, NC (US); Jean Louis Calvignac, Cary, NC (US); Marco C. Heddes, Raleigh, NC (US); Steven Kenneth Jenkins, Raleigh, NC (US); Michael Steven Siegel, Raleigh, NC (US); Fabrice Jean Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/548,906

(22) Filed: Apr. 13, 2000

(51) Int. Cl.$^7$ ............................................. H04L 12/28
(52) U.S. Cl. ...................... 370/390; 370/392; 370/394
(58) Field of Search ................................ 370/389, 390, 370/392, 394, 400, 432

(56) References Cited

U.S. PATENT DOCUMENTS

| | | | | |
|---|---|---|---|---|
| 4,813,038 A | * | 3/1989 | Lee ........................... | 370/390 |
| 5,418,937 A | | 5/1995 | Inoue ......................... | 395/575 |
| 5,666,361 A | | 9/1997 | Aznar et al. ................. | 370/392 |
| 5,680,402 A | | 10/1997 | Olnowich et al. ........... | 370/498 |
| 5,684,797 A | | 11/1997 | Aznar et al. ................. | 370/390 |
| 5,764,875 A | | 6/1998 | Badovinatz et al. ... | 395/182.02 |
| 5,787,084 A | | 7/1998 | Hoang et al. ................ | 370/390 |
| 6,185,206 B1 | * | 2/2001 | Nichols et al. ............. | 370/390 |
| 6,188,690 B1 | * | 2/2001 | Holden et al. .............. | 370/390 |
| 6,247,059 B1 | * | 6/2001 | Johnson et al. ............. | 709/237 |
| 6,434,117 B1 | * | 8/2002 | Momona ..................... | 370/236 |

FOREIGN PATENT DOCUMENTS

| | | |
|---|---|---|
| EP | 0 876 027 A2 | 11/1998 |
| JP | 10308759 | 3/1998 |
| JP | 11127197 | 6/1998 |
| WO | WO 99/17458 | 4/1999 |

OTHER PUBLICATIONS

IBM Technical Disclosure Bulletin, vol. 36, No. 02, Feb. 1993, pp. 67-69 "Buffer Management Scheme for Gigabit IP Routers".
IBM Technical Disclosure Bulletin, Mar., 1997, pp. 181-182.
IBM Technical Disclosure Bulletin, Jul., 1996, pp. 275-280.
INSPEC article by K. Ravindran "Computer Channels for Data Multicasting in multi-service networks".
INSPEC article by M. Iwane et al. "Multiple Statistic Barrier Management MIMD . . . ".
INSPEC article by K. Ravindran et al. "Incorporation of flow and QoS control in multicasting routing architecture".

* cited by examiner

*Primary Examiner*—Ricky Ngo
*Assistant Examiner*—Christine Ng
(74) *Attorney, Agent, or Firm*—Kenneth A. Seaman; Joscelyn G. Cockburn (57) ABSTRACT

A system and method of transmitting multiple output messages from a single input message system where the system is keeping the messages in order by correlating the output messages with the input messages. For each output message, an indicator is associated with the output message indicating whether this output message is the last message being generated for the given input message. This allows multicasting to occur in a system where the output is matched to the input by allowing multiple output messages to be associated with a single input message.

4 Claims, 6 Drawing Sheets

FIG. 1
(PRIOR ART)

FIG. 2
(Prior Art)
BLOCK DIAGRAM OF THE EPC

| FRAME | PROCESSOR | LABEL | DESTINATION | |
|---|---|---|---|---|
| 1 | 0 | Q1+0 | A | 701 |
| 1 | 0 | Q1+1 | B | 702 |
| 2 | 7 | Q2+0 | A | 703 |
| 3 | 5 | Q3+0 | A | 704 |
| 4 | 2 | Q1+0 | A | 705 |
| 2 | 7 | Q2+1 | B | 706 |
| 4 | 2 | Q1+1 | B | 707 |
| 1 | 0 | Q1+2 | C | 708 |
| 4 | 2 | Q1+2 | C | 709 |
| 5 | 4 | Q3+0 | A | 710 |

METHOD AND SYSTEM FOR DATA FLOW MULTICASTING

CROSS REFERENCE TO RELATED PATENTS

The present invention is related to the following patents and patent application, all of which are specifically incorporated herein by reference:

U.S. Pat. No. 5,764,875 entitled "Communications Program Product Involving Groups of Processors of a Distributed Computing Environment" by Peter Richard Badovinatz et al. and assigned to the assignee of the present invention. This patent is sometimes referred to as the Multicasting Patent in this document.

U.S. patent application Ser. No. 09/384,691 filed Aug. 27, 1999 by Brian Bass et al. and entitled "Network Processor Processing Complex and Methods", which is also assigned to the assignee of the present invention. This document is sometimes referred to herein as the Network Processing Unit Patent (or NPU Patent).

U.S. patent application Ser. No. 09/479,028 entitled "Method and System for Network Data Flow Management" filed Jan. 7, 2000 by Brian Bass et al. and assigned to the assignee of the present invention. This patent is sometimes referred to herein as the Data Management Patent.

U.S. Pat. No. 5,684,797 entitled "ATM Cell Multicasting Method and Apparatus" by Ange Aznar et al. This patent is sometimes referred to herein as the ATM Vector Patent.

U.S. Pat. No. 5,666,361 entitled "ATM Cell Forwarding and Label Swapping Method and Apparatus" by Ange Aznar et al. This patent is sometimes referred to in this document as the ATM Cell Forwarding Patent. U.S. Pat. No. 5,680,402 entitled "Priority Broadcast and Multi-cast for Unbuffered Multi-stage Networks" by Howard Thomas Olnowich et al. This patent is sometimes referred to as the Node Interconnection Patent in this document.

Pending patent application Ser. No. 09/330,968 entitled "High Speed Parallel/Serial Link for Data Communications" filed on Jun. 11, 1999 and assigned to the assigned of the present invention.

BACKGROUND OF THE INVENTION

1. Field of the Invention

The present invention relates to an improved system and method for multicasting in a network processing system. The term "multicasting", as used herein, is meant to describe a system for message creation and distribution addressing the same data content (a message consisting of one or more frames) to multiple addressees, and may result either from a broadcast message (e.g., a message to all units in the network) or a message for a distribution list (a message for all those recipients listed in a predefined or stored distribution list of recipients).

2. Background Art

Communications between information handling systems such as computers has been growing rapidly over the past few years, due, at least in part, to the rise in communications with the Internet and in private data networks. More and more devices are doing more and more communications over the networks which provide remote access to an increasing amount of data and processing power.

As network usage has grown over this time, it has translated into an explosion of messages or network traffic, each of which must be passed from the origin to the desired destination accurately. This has given rise to an increasing demand on routers and switches, those network devices which receive messages and direct them to the appropriate destination, either an internal address on a local network or to an external device on another network.

The rising amount of network traffic and the increasing number of communicating terminals has meant that more communications traffic has to be routed through routers and switches. As a result, the routers and switches have become faster and more sophisticated, processing an increasing amount of information faster and with greater efficiency.

Data processing systems such as are described in the NPU Patent use one of a plurality of processors to receive input information units or frames from a dispatcher and send the completed or output information unit to a completion unit for further handling, such as enqueueing it on an outbound bus back out to the network (in what is sometimes referred to as a downward flow) or distribution to a switch fabric for an internal address associated with the switch rather than the network (in a data flow which is sometimes referred to an upward or up flow).

Some of such systems have been defined to expect a processing unit to generate exactly one (one and only one) output information unit for each input information unit. Hence, systems such as are described in the Data Management Patent look for the one output information unit created for each input information unit. However, when individually-addressed messages are being created in a multicasting environment, by definition, a single input message is addressed to a plurality of recipients and therefore, in a system where the individual messages are created from a single multicast message, inherently then a plurality of output messages will be created from a single input message, rather than the one output for one input which is suggested in some systems.

Neither the NPU Patent nor the Network Management Patent include a provision of a system and apparatus for effectively multicasting messages, but such messages must be accommodated and must be handled without disrupting a single data flow. That is, the second message or frame from a given data flow must not precede the first frame of the same data flow for any recipient.

Some systems like the Multicasting Patent referenced above assign the creation of multicast messages to a single processor or to a group of processors (such as a group leader) as a way of managing the requirement to send multiple output messages from a single input message. This requires differentiation in the capabilities of the multicasting processor, requiring a different configuration—at least a different set of application programming code, if not a different set of hardware as well—to implement multicasting. It also results either in having a limited multicasting resource (which could get overwhelmed with multicast requests) or the extra capability in a plurality of different processors (unnecessary capabilities in many instances).

Such a system which may create multiple messages requires knowing when the multiple messages are completed—when the last output information unit has been created from a single input information unit. This can either be done by indicating the number of messages being created and counting the output messages as they are created or in identifying the last message created as the last output message being created from a single input.

It is also important that output messages from a single data flow be kept in sequence order—a first-in-first-out arrangement—so that stations receiving messages from that single data flow will receive them in the proper order. A single data flow may consist of two or more input information units or frames and those frames may be processed by different processing units of the type described in the NPU Patent at different times. Typically, a single frame is sent to a single processing unit, but then the next frame is likely to be sent to a different processing unit. If both frames are part of the same data flow and multicast to the same recipient, then it is desired that the frames be received by the recipient in the same order in which the frames were originally received, regardless of which of a plurality of processing units processed each or how long the processing of each frame takes. It is easy to imagine a data flow of two frames, the first of which requires a significant amount of processing and the second requiring little processing. If both of these frames are sent for multicasting to different processors, the first frame might be still being prepared for the first recipient when the second frame has been prepared for multiple recipients in succession.

Previously proposed systems have disadvantages and limitations, either in not keeping the frames in the order in which they were received or in having a complex system for keeping the messages in order or reassembling the messages in the proper order later, or in simply not supporting the multicasting of messages by a plurality of independent, yet similar, processing units.

Accordingly, the systems of the prior art have undesirable disadvantages and limitations, particularly as it relates to multicasting of messages in a system which employed multiple parallel processing units.

SUMMARY OF THE INVENTION

The present invention overcomes the disadvantages and limitations of the prior art systems by providing a simple, yet effective, method and system for multicasting messages in a system involving a plurality of similar, yet independent, processors. The present invention allows the formatting a single data flow including a plurality of frame addressed to a number of recipients into a plurality of frames, each addressed to a single recipient, while keeping the order of the frames within the data flow so that each recipient receives the frames of the data flow in the proper order.

The present invention has the advantage that it is simple and easy to implement. It is efficient in the handling of multicast messages without allowing portions of the message to become mixed up.

The present invention allows for multicast messages to be intermixed with messages addressed to a single recipient in a system to process the messages that does know in advance whether a message is addressed to a single recipient or whether a message is a multicast message and whether a single output is to be created from a single input or whether multiple outputs are to be created from a single input information unit.

The present invention also allows for the use of a system which keeps track of the input information units sent to the processing units and matching the output information units received from those processing units by allowing a single input message to have multiple output messages.

The present system also allows for multicasting of messages to occur without the system controller needing to know how many multicast messages are created from a single message or how many frames or messages are addressed to a single destination. The system provides an indicator when a message is the last message (or output information unit) created from a single input information unit. In the case of an input information unit processed by a processor into a single output information unit, that single output information unit carries the flag that this is the last output information unit. In the case of a multicast message series of output information units, only the last message being created in response to a single input information unit carries the indicator that it is m in fact, the last message created from the single input information unit.

The present system allows for the multicasting of data flows which comprise multiple frames, with the possibility that the multiple frames are assigned to different processors and still being processed simultaneously. The present invention allows the processing of the related data flows (a data flow including a plurality of frames being multicast) without requiring that the individual processors communicate or coordinate one with the other in processing the related frames, and without having a supervisory system which manages the plurality of processors in their processing of the individual frames comprising the single data flow which is being multicast to a plurality of recipients.

Other objects and advantages of the present invention will be apparent to those skilled in the relevant art in view of the following description of the preferred embodiment, taken together with the accompanying drawings and the appended claims.

BRIEF DESCRIPTION OF THE DRAWINGS

Some of the objects and advantages of the present invention having been set forth in the preceding material, others will become apparent through the following description of the present invention is an improved system and method for multicasting in which.

DETAILED DESCRIPTION OF THE PREFERRED EMBODIMENT

In the following description of the preferred embodiment, the best implementation of practicing the invention presently known to the inventors will be described with some particularity. However, this description is intended as a broad, general teaching of the concepts of the present invention in a specific embodiment but is not intended to be limiting the present invention to that as shown in this embodiment, especially since those skilled in the relevant art will recognize many variations and changes to the specific structure and operation shown and described with respect to these figures.

Figure 1:
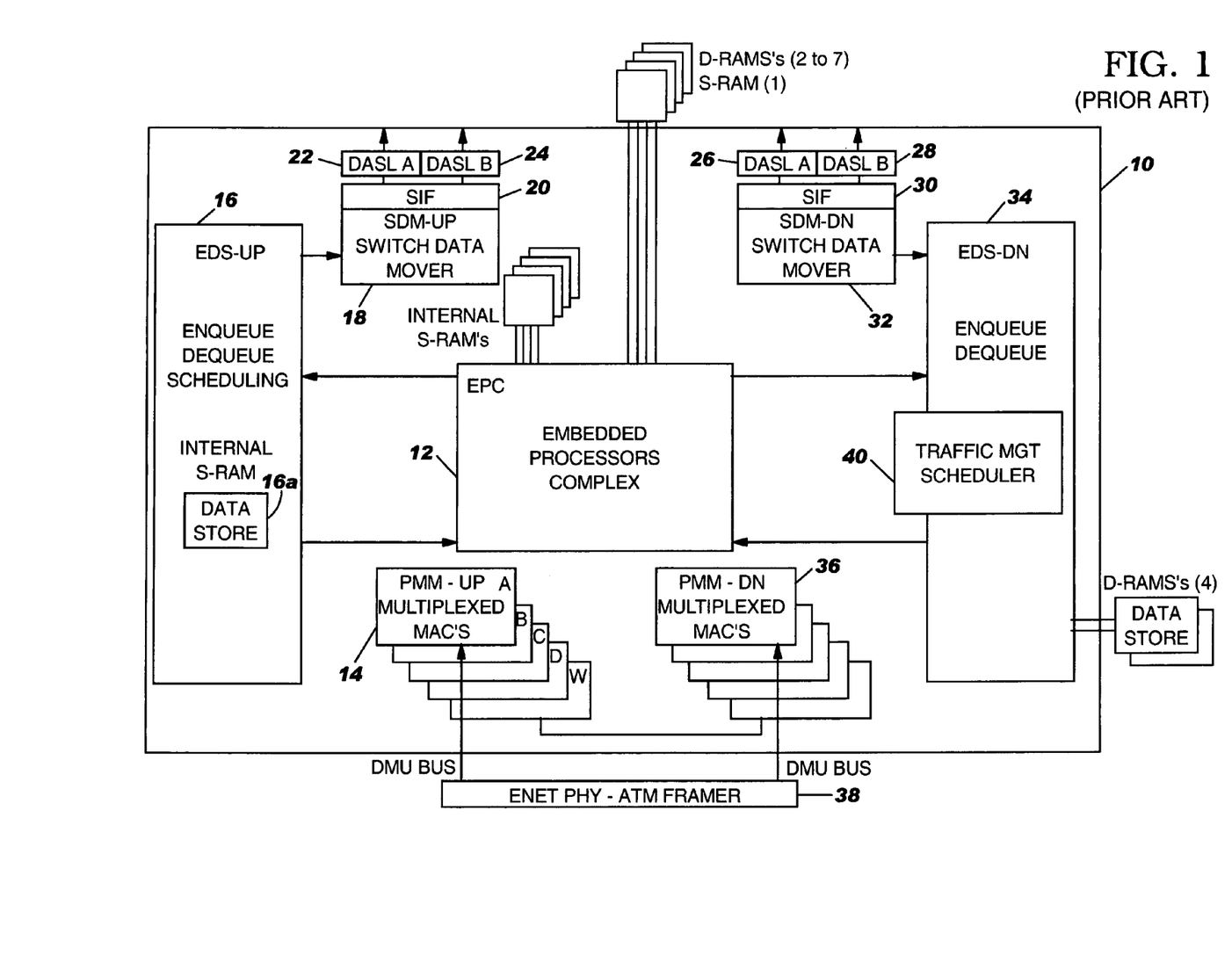
FIG. 1 is a block diagram of an interface device including an embedded processor complex useful in the present invention.

FIG. 1 illustrates a block diagram of the interface device chip that includes a substrate 10 and a plurality of subassemblies integrated into the substrate 10. These subassemblies are arranged into an "upside" (or "ingress") configuration referring to the components for handling data inbound toward the chip from a data transmission network (up from the network and into the chip) and "downside" (or "egress") configuration for handling data which is flowing from the chip toward the data transmission network (down from the chip and toward the network). The details of the configuration of these subassemblies is discussed in greater detail in the NPU Patent referenced above, and the reader is encouraged to consult that document for a greater understanding of the structure and operation of the interface device. The embedded processor complex 12 communicates with an enqueue-dequeue-scheduling module 16 for the UP direction (EDS-UP) which, in turn is connected to multiple multiplexed MAC's-UP 14 and a Switch Data Mover-UP (SDM-UP) 18. In turn, the MAC's-UP 14 are connected to an Ethernet Physical layer 38 which includes an ATM Framer to identify and present frames of information from the network. The Switch Data Mover (or SDM-UP) 18 is connected to a System Interface or SIF 20 which couples to Data Align Serial Links 22,24, one form of which is described in the Link Patent.

Figure 2:
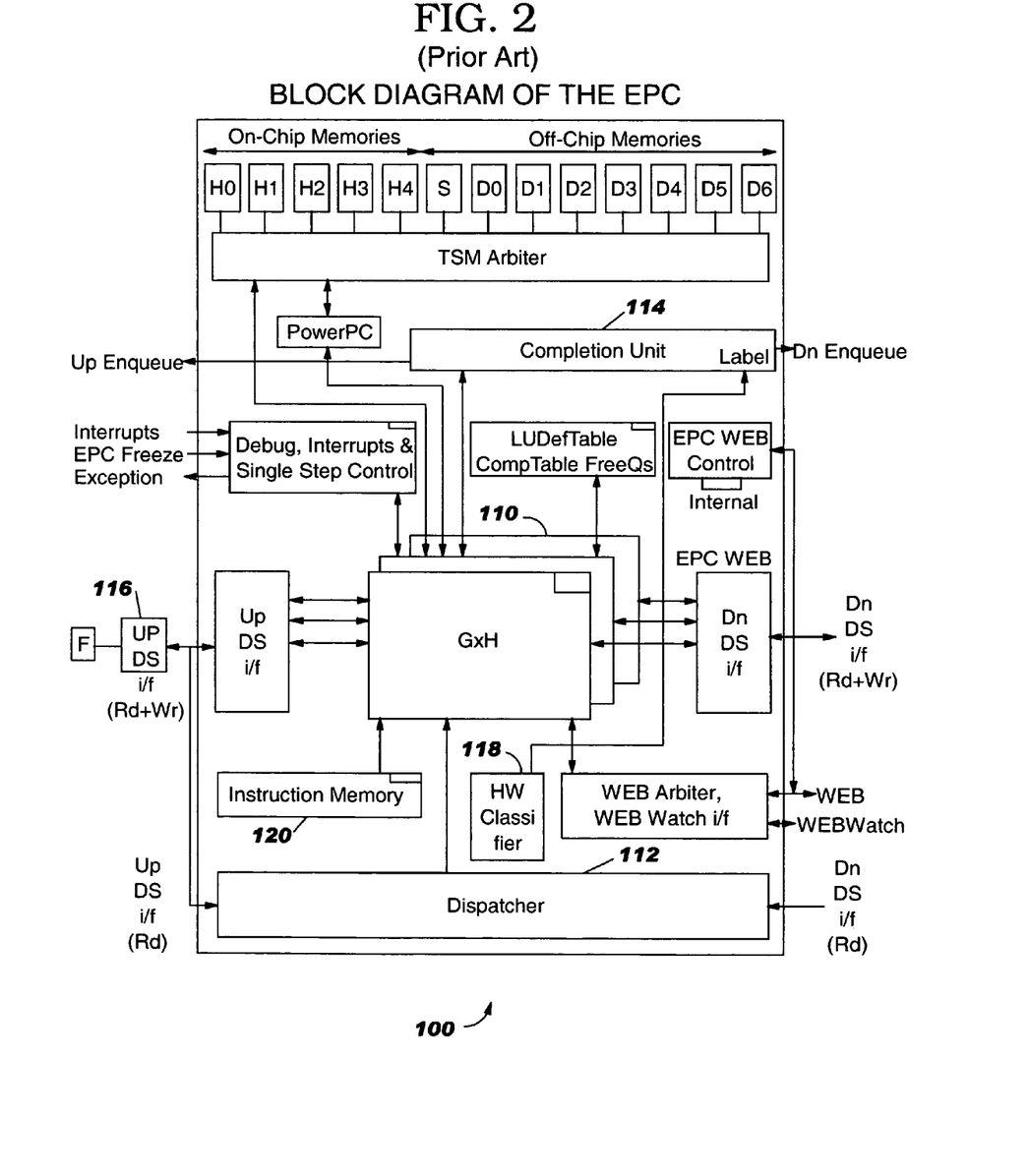
FIG. 2 is a block diagram of a embedded processor complex (or network processing unit as taught by the NPU Patent referenced above)

FIG. 2 illustrates components of the network processing unit complex used in the present invention. This complex is described more fully in general in connection with the NPU Patent. Also of interest in understanding the present invention and its background is the Data Management Patent, which describes a system for managing various data flows and keeping frames from respective data flows in the proper order. That is, a single message or data flow may consist of a plurality of frames, and it is desirable that the frames forming a single data flow be delivered to each recipient in the proper order.

Figure 3:
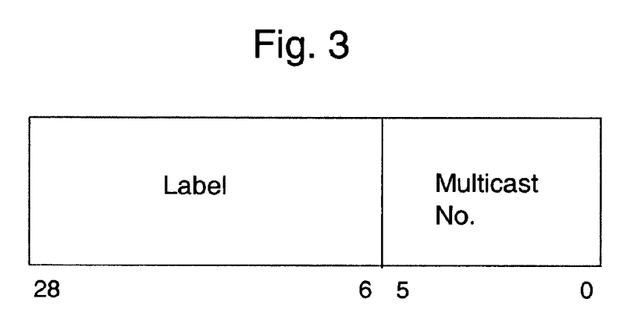
FIG. 3 is a diagram of a label field used in the present invention.

FIG. 3 illustrates the format of a label field for keeping track of the data units being processed by the plurality of network processing units which make up the network processing complex described in the NPU Patent and which operate independently, in the preferred embodiment, from each other in processing data from the network. The label field includes a first or left portion from bit 28 through bit 6 which is a label for the particular data flow and a second or right portion from bit 5 through bit 0 which is a multicast sequence number.

Figure 4:
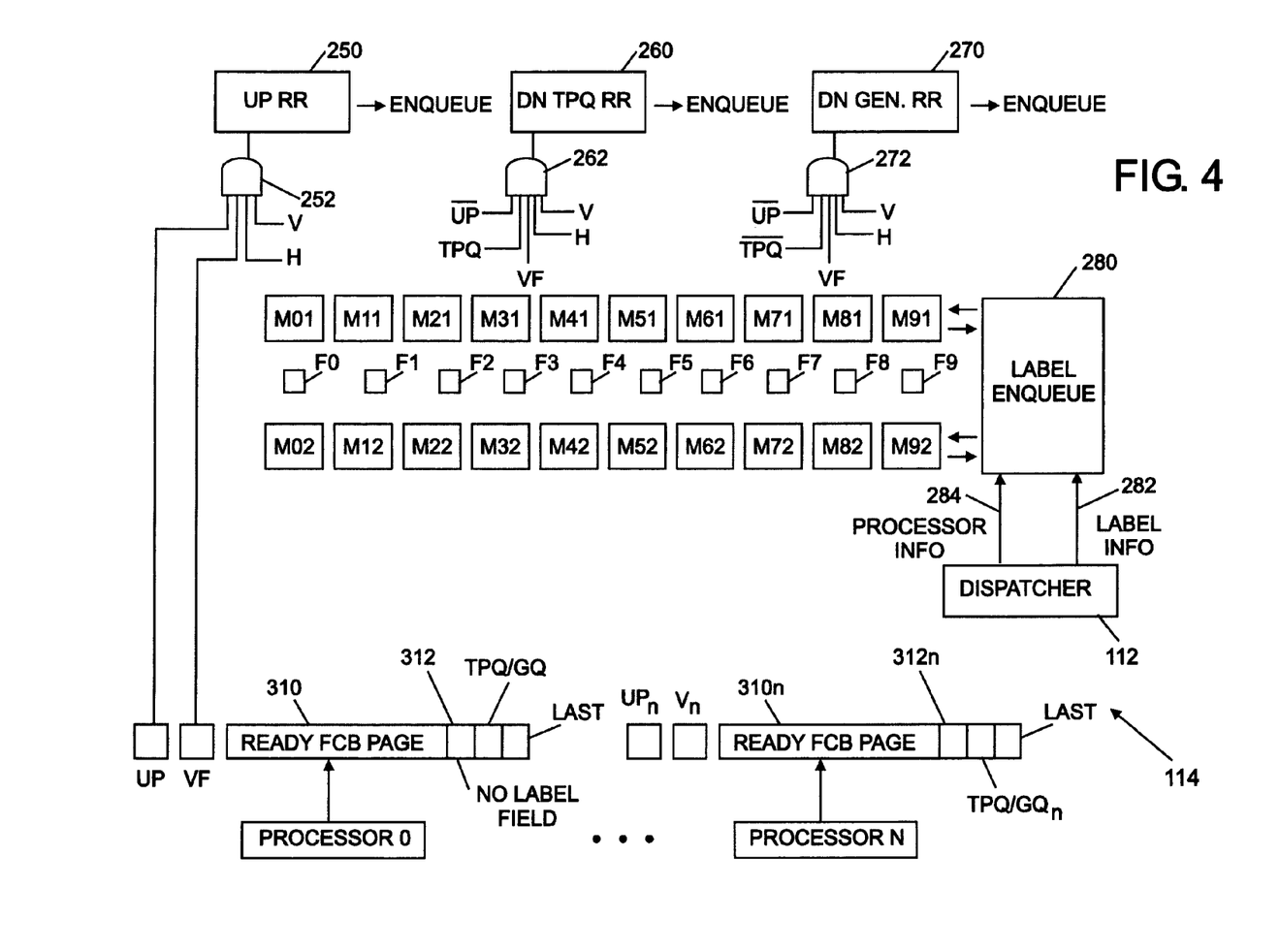
FIG. 4 is a diagram of the components of a data flow management system useful in the present invention.

FIG. 4 illustrates a more detailed structure of the completion unit 114 used in processing input information units and employing the data management techniques used in the present invention. The completion unit 114 as shown in this embodiment communicates with a plurality of round robin devices for distributing the output (e.g., processed information units) of the processing units, not shown in this FIG. 4. The plurality of round robin devices include an up-round robin 250 and two down round robin devices, one round robin identified as 260 for target ports (a small number of frequently used ports addressed specifically) and one round robin 270 for general distribution (processed information addressed to other ports than the specifically addressed target ports).

Logical AND gates 252, 262, 272 provide the gating for the round robins 250, 260, 270, respectively. For the AND gate 252 which provides a frame to the UP round robin 250, the inputs are that it be an UP frame (from the block UP associated with the Ready FCB page 310), that the frame be a valid frame (the indicator VF that it is a valid frame, ready for transmission), that the label field be valid in the associated frame label field (M01 through M92) and that the label be associated with a head of a message flow—the earliest.

The dispatcher 112 provides two pieces of information to the label enqueue 280 when a frame or input information unit is dispatched to a given processor—a label for the frame on line 282 and the identity of the processor to which the frame has been assigned on line 284. The label transferred from the dispatcher 112 to the label enqueue 280 always has the multicast number set to "0". The label for the frame identifies the message flow to which the frame belongs, which, in the preferred embodiment, is based on the MAC plus the source address less the destination address, with the objective of providing a unique identifier for each message flow so that frames from the same message flow will have the same label and messages from different message flows will have different labels or identifiers.

Each Ready FBC Page has a LAST field indicating that the current page is the last outgoing information unit derived from a single input information unit. For data flows which are unicast (one output message for each input message), then this field is set to 1 for each information unit. For a multicast message, then only the last of the multiple output information units would be marked with a 1 indicating that this is the last output information unit for the input information unit. Each previous multicast information unit would have a 0 in the last field denying that it is the last output information unit from the input information unit.

When the LAST label is not set, then when the frame goes out the top of FIG. 4, the label from one of the 20 M boxes is not discarded but is recirculated through the label enqueue process of box 280. The processor number (where the label came from) goes into the label enqueue box 280 and the low six bits of the label field are incremented before it goes back through the box 280. Another important note is when a processor is working on a multicast frame, it is going to send it to the destinations in order and that order must be maintained. So, when two different processors are independently working on different portions of the same data flow each processor must be sending out the output information units in the same order to the destinations—that is, the order of destinations must be preserved for each information unit processed for a given data flow. This is generally not a problem since all of the processors are executing the exact same instruction code where the destinations and order of destinations is the same list for a given data flow. See the Data Management Patent for additional details on the structure and operation of the completion unit 114 of the present invention.

Figure 5:
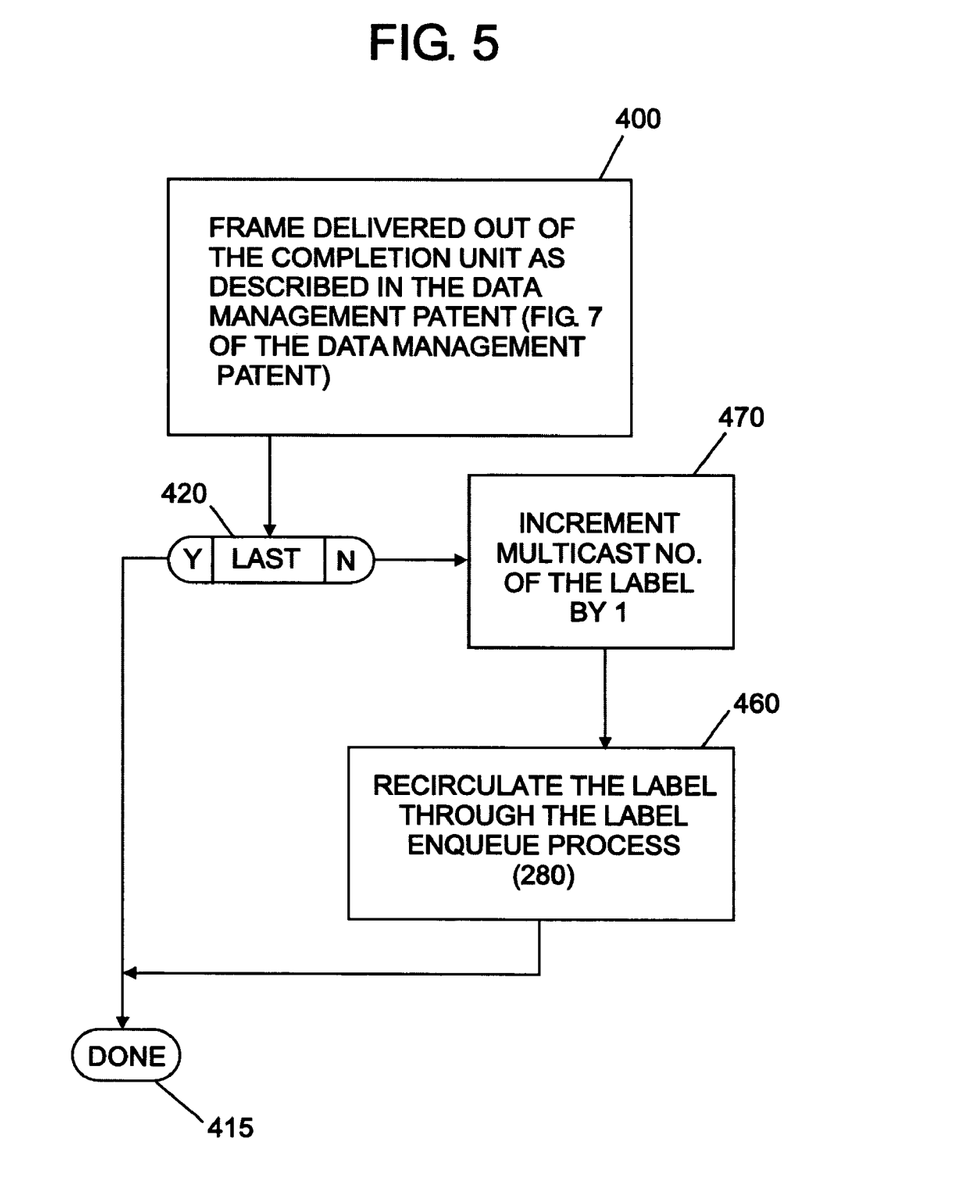
FIG. 5 is a flow chart illustrating the principles of the multicasting of the present invention.

FIG. 5 illustrates the logic flow of the multicast logic of the present invention which is performed by the multicast communication coordination of the system. At block 400, the frame is delivered out of the completion unit (see FIG. 7 of the Data Management Patent referenced above). Then, at block 420 it is tested to determine whether it is the last field has been set (indicating that it is either a unicast or the last multicast message from a single message, the last destination of the several destinations for the single message.) If the field is not set, then at block 470 the multicast portion of the label is incremented by one and the frame is recycled through the label enqueue (label enqueue 280 as shown in FIG. 4) at block 460.

Figure 6:
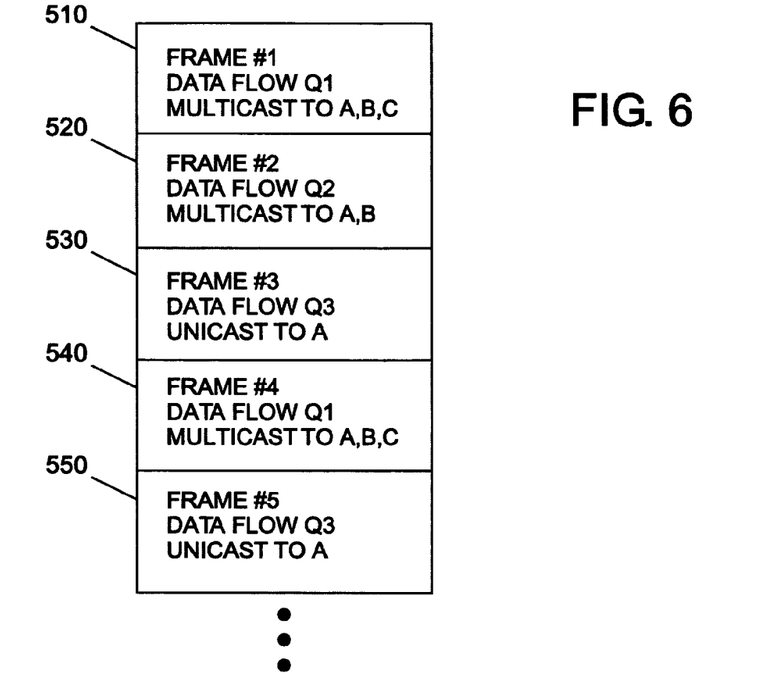
FIG. 6 illustrates an example of frames which may be encountered in an apparatus for receiving and processing data flows from a network.

FIG. 6 illustrates a sample set of frames, each with information as to the dataflow and which addresses it is to be multicast to, for the purpose of illustrating in FIG. 7 the process described in connection with FIG. 5. Message 510 is frame #1 from dataflow Q1, a multicast frame directed to A, B and C. Message 520 is frame #2 from dataflow Q2, a multicast frame directed to A and B. Message 530 is frame #3 for dataflow Q3 unicast to only A (i.e., it is not a multicast frame). Message 540 is frame #4 part of dataflow Q1 (like message 510), a multicast frame to A, B and C. Message 550 is frame #5 of dataflow Q3 unicast only to A.

Figure 7:
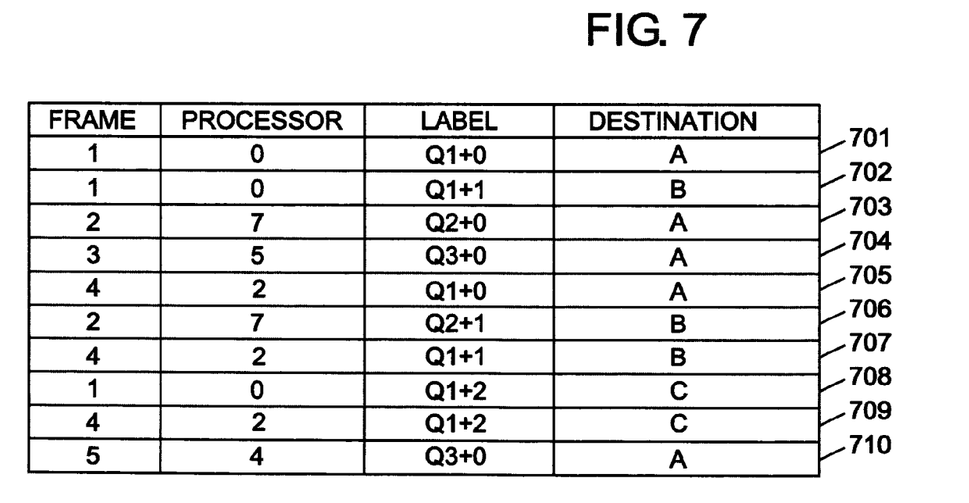
FIG. 7 illustrates an example of the handling of the frames of FIG. 6 by the system of the present invention.

FIG. 7 illustrates the principles of the present invention and the logic of FIG. 5 in processing the frames of FIG. 6. The line 701 indicates the first of the series of frames to be processed by the label enqueue 280 in FIG. 4, processing the message 510 by assigning it to an available processor 0 with the label Q1+0 (that is, Q1 on the left side of the label field of FIG. 3 and 0 in the right side), with the frame addressed to A. At line 702, the label field has been incremented to Q1+1 and the frame is addressed to B, being processed by the same processor 0. At line 703, frame #2 from message 520 is being processed by processor 7 (a processor which was available) and has a label field Q2+0 with a destination of A. Before that message 520 is completed and recirculated through the label enqueue 280, frames 3 and 4 arrive for processing as lines 704 and 705 and are assigned to processors 5 and 2 respectively. At line 706 frame 2 is sent to processor 7 with a destination of B. Then, at line 707 the second multicast message for message 540 arrives and is assigned to processor 2, with a label Q1+1 for its second destination B. At line 708 the third multicast for message 510 arrives with a label Q1+2 for destination C.

Until line 708 was processed, the multicast for message 540 was blocked because its label was equal to that of the label of message 510, illustrating the blocking mechanism of the present invention. Frame 540 has to wait until the earlier parts of the same message flow (e.g., message 510) have been delivered to a destination such as C before the later portions of the same data flow can be delivered to the same destination.

At line 709, then the other multicast messages for message 540 can be handled for destination C by the same processor 2 as handled the same frame for destinations A and B at lines 705 and 707. Finally for the example of FIG. 5, the message 550 is assigned to processor 4 and has a label Q3 at line 710.

Of course, many modifications of the present invention will be apparent to those skilled in the relevant art in view of the foregoing description of the preferred embodiment, taken together with the accompanying drawings. For example, the indicator that the last message has been created could be replaced by an indicator that there are additional output information units being created for the single input information unit. Additionally, the present system could indicate how many output information units were created for a single input information unit, rather than include the indicator that a given output information unit was the last information unit being created for a single input information unit. The system could also include an indicator as to whether there were multiple output information units being created for a given input information unit, so that it would be known whether or not to expect additional output information units. Additionally, the manner and location of the indicator—being stored in the data store—are believed to be desirable locations for the information, but certainly not the only was to make the information available. Thus, it is believed that there are many ways of modifying the preferred embodiment without departing from the spirit of the present invention. It is also assumed that some of the features of the present invention could be used to advantage and achieve some of the desirable results without the corresponding use of other features. Accordingly, the foregoing description of the preferred embodiment should be considered as merely illustrative of the principles of the present invention and not in limitation thereof.

What is claimed is:

1. A system for processing information units in a distributed processing environment where some but not all of the information units are to be sent to a plurality of different addresses, the system comprising:
   a substrate including a plurality of processors, each processor for independently receiving an input information unit and creating an output information unit;
   a dispatch unit carried on the substrate and coupled to the plurality of processors for receiving an input information unit and transferring the input information unit to one of said plurality of processors;
   a completion unit for receiving the output information units from the plurality of processors and transmitting the output information units in an order corresponding to the input information units were received by the dispatch unit; and
   a system for allowing the processing units to generate a plurality of output messages from a single input information unit, the system including an indicator created by the processing unit for each output information unit indicating whether the output information unit is the last output information unit created for the single input information unit, with the completion unit responding to the indicator and processing each message from a single input information unit until it processes an output information unit indicating that it is the last output information unit for the input information unit.

2. A system of the type described in claim 1 wherein the system for indicating whether the output information unit is the last output information unit for a single input information unit also includes a system for putting a sequence number on each output information unit created from a single input information unit.

3. A system of the type described in claim 1 further including a system for preventing the output of one processor from being passed from the completion unit until previously received messages from the same data flow have been processed, whereby later information units from the same data flow are not processed from the completion unit before earlier information units from the same data flow.

4. A system of the type described in claim 2 wherein the sequence number for each multicast message is incremented each time a new destination is provided.

* * * * *